(12) United States Patent
Kim

(10) Patent No.: US 12,257,987 B2
(45) Date of Patent: Mar. 25, 2025

(54) ELECTRONIC PARKING BRAKE SYSTEM

(71) Applicant: HL MANDO Corporation, Pyeongtaek-si (KR)

(72) Inventor: Min Ho Kim, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 318 days.

(21) Appl. No.: 17/882,760

(22) Filed: Aug. 8, 2022

(65) Prior Publication Data
US 2023/0106917 A1    Apr. 6, 2023

(30) Foreign Application Priority Data
Oct. 1, 2021   (KR) .................... 10-2021-0130502

(51) Int. Cl.
*B60T 13/74* (2006.01)
*H02P 3/18* (2006.01)

(52) U.S. Cl.
CPC ............... *B60T 13/74* (2013.01); *H02P 3/18* (2013.01); *B60T 2240/00* (2013.01)

(58) Field of Classification Search
CPC ............ B60T 13/74; B60T 2240/00; B60T 2270/402; B60T 2270/84; H02P 3/18; H02P 5/68; H02P 3/00; B60R 16/03; B60Y 2400/114
See application file for complete search history.

(56) References Cited

U.S. PATENT DOCUMENTS

| | | | | |
|---|---|---|---|---|
| 2013/0282249 A1* | 10/2013 | Heise | ........... | B60T 13/746 701/70 |
| 2021/0188233 A1* | 6/2021 | Yuyama | ........... | H02K 11/33 |
| 2021/0237706 A1* | 8/2021 | Kim | ........... | B60T 13/745 |
| 2022/0194344 A1* | 6/2022 | Tarandek | ........... | B60T 8/17 |
| 2023/0339447 A1* | 10/2023 | Ha | ........... | B60T 13/741 |

FOREIGN PATENT DOCUMENTS

| | | | | |
|---|---|---|---|---|
| CA | 2879295 A1 * | 1/2014 | ........ | B60L 15/2009 |
| DE | 102016012617 A1 * | 4/2018 | ........ | B60T 13/74 |

* cited by examiner

*Primary Examiner* — Bickey Dhakal
(74) *Attorney, Agent, or Firm* — Harvest IP Law, LLP

(57) ABSTRACT

The electronic parking brake system according to an exemplary embodiment of the present disclosure includes a first ECU (electronic control unit) and a second ECU respectively connected to a plurality of motors for providing a driving force to a wheel to control the plurality of motors, wherein the second ECU includes a power reserve system for storing power supplied from a battery; a switch for switching to connect the plurality of motors to the first ECU or the second ECU based on the operating state of the first ECU; and a second MCU for identifying an operating state of the first ECU, controlling the switch to connect the plurality of motors from the first ECU to the second ECU based on the operating state being an inactive state, and controlling the plurality of motors through the power stored in the power reserve system.

20 Claims, 8 Drawing Sheets

ELECTRONIC PARKING BRAKE SYSTEM

CROSS-REFERENCE TO RELATED APPLICATION

This application claims priority to and the benefit of Korean Patent Application No. 10-2021-0130502, filed on Oct. 1, 2021, the disclosure of which is incorporated herein by reference in its entirety.

TECHNICAL FIELD

The present disclosure relates to an electronic parking brake system.

BACKGROUND ART

Recently, as interest in autonomous vehicles or electric vehicles has increased, the electronic brake system that electronically controls the operation of a brake has been developed. For example, the integrated electronic brake system (IDB: integrated dynamic brake) that uses an electronic master booster instead of the conventional hydraulic system and is built by integrating the anti-lock brake system (ABS) and the electric stability control system (ESC) has been developed.

In particular, since the IDB system can control not only the service brake operated during general driving but also the parking brake, it has become possible to reduce the size and weight of the brake system, and while providing various functions, stability has also been greatly improved.

Since many parts of e electronic parking brake system are made up of electronic equipment, various technologies for implementing the redundancy of the electronic parking brake system have been proposed in order to increase the reliability of the operation of the system.

DISCLOSURE

Technical Problem

An object of the present disclosure is to provide a more stable electronic parking brake system by not only implementing redundancy for the ECU, but also securing redundancy for the battery.

Another object of the present disclosure is to provide an electronic parking brake system, including a more efficient and economical power reserve system.

Technical Solution

The electronic parking brake system according to an exemplary embodiment of the present disclosure includes a first ECU (electronic control unit) and a second ECU respectively connected to a plurality of motors for providing a driving force to a wheel to control the plurality of motors, wherein the second ECU includes a power reserve system for storing a power supplied from a battery; a switch for switching to connect the plurality of motors to the first ECU or the second ECU based on the operating state of the first ECU; and a second MCU for identifying an operating state of the first ECU, controlling the switch to connect the plurality of motors from the first ECU to the second ECU based on the operating state being an inactive state, and controlling the plurality of motors through the power stored in the power reserve system.

The power reserve system may include a super capacitor for charging a first power supplied from the battery and discharging the first power based on a power supply signal.

The switch may be a first switch, wherein a second switch, which is disposed between the super capacitor and the first switch and configured to receive the power supply signal and switch to an on state, may be included, and wherein the second MCU may transmit the power supply signal to the second switch to control the plurality of motors.

The switch may be a first switch, wherein the power supply signal may include a first power supply signal and a second power supply signal, wherein a third switch, which is disposed between the super capacitor and the first switch and configured to switch to a first state for applying a braking force to the plurality of motors by receiving the first power supply signal, or to a second state for releasing a braking force applied by the plurality of motors by receiving the second power supply signal, may be included, and wherein the second MCU may transmit the first power supply signal or the second power supply signal to the third switch to control the plurality of motors.

The power reserve system may further include a regulator for supplying the first power which is constant to the super capacitor.

When a braking signal is received, the second MCU may identify a wheel speed based on a detection signal received from a WSS, and transmit the power supply signal to the second switch, if the wheel speed is less than or equal to a predefined value.

The second ECU may further include an ASIC, and wherein the ASIC may identify a wheel speed based on a detection signal received from a WSS in response to receiving a braking signal, and transmit the power supply signal to the second switch, if the wheel speed is less than or equal to a predefined value.

The super capacitor may discharge the first power based on the first power supply signal, and charge the first power from the battery based on the second power supply signal.

The second ECU may further include an ASIC, wherein the ASIC may identify a wheel speed based on a detection signal received from a WSS in response to receiving a braking signal, and transmit the first power supply signal to the third switch, if the wheel speed is less than or equal to a predefined value.

The second MCU may identify the operating state by receiving information about the operating state from the first ECU, and transmits a switching change signal to the switch according to the operating state.

The switch may be a first switch, and wherein the first ECU may include a motor driving circuit respectively connected to the plurality of motors to drive a plurality of actuators for controlling the plurality of motors; and a first MCU for controlling the plurality of motors through the motor driving circuit based on receiving a braking signal The second MCU may perform communication with the first MCU periodically or in real time through a data bus.

The power reserve system may further include a power protection circuit to supply the first power which is constant to the super capacitor.

The power reserve system may further include a step-up converter for increasing a voltage of the first power charged in the super capacitor to a second power which voltage is higher than the voltage of the first power.

The method for controlling an electronic parking brake system, which includes a first ECU (electronic control unit) and a second ECU respectively connected to a plurality of motors for providing a driving force to a wheel to control the plurality of motors, includes the steps of: storing a power supplied from the battery in a power reserve system of the second ECU; identifying an operating state of the first ECU; controlling a switch so as to connect the plurality of motors from the first ECU to the second ECU based on the operating state being an inactive state; and controlling the plurality of motors through the power stored in the second ECU.

The switch may be a first switch, wherein a second switch, which is disposed between the super capacitor and the first switch and configured to receive the power supply signal and switch to an on state, may be included, and wherein the step of controlling of the plurality of motors may include controlling the plurality of motors by transmitting the power supply signal to the second switch.

The switch may be a first switch, wherein the power supply signal may include a first power supply signal and a second power supply signal, wherein a third switch, which is disposed between the super capacitor and the first switch and configured to switch to a first state for applying a braking force to the plurality of motors by receiving the first power supply signal, or to a second state for releasing a braking force applied by the plurality of motors by receiving the second power supply signal, may be included, and wherein the step of controlling the plurality of motors may include controlling the plurality of motors by transmitting the first power supply signal or the second power supply signal to the third switch.

The step of controlling the plurality of motors may include the steps of identifying a wheel speed based on a detection signal received from WSS when a braking signal is received; and transmitting the power supply signal to the second switch if the wheel speed is less than or equal to a predefined value.

Advantageous Effects

According to an exemplary embodiment of the present disclosure, it is possible to provide a more stable brake system by not only implementing redundancy for the ECU, but also securing redundancy for the battery.

In addition, by including additional control on the power supply of the power reserve system according to an exemplary embodiment of the present disclosure, it is possible to efficiently use the power reserve system.

According to an exemplary embodiment of the present disclosure, by not only charging the power reserve system with a predetermined voltage, but also by stably driving the power reserve system including a super capacitor, it is possible to further improve stability in redundancy implementation.

MODES OF THE INVENTION

Figure 1:
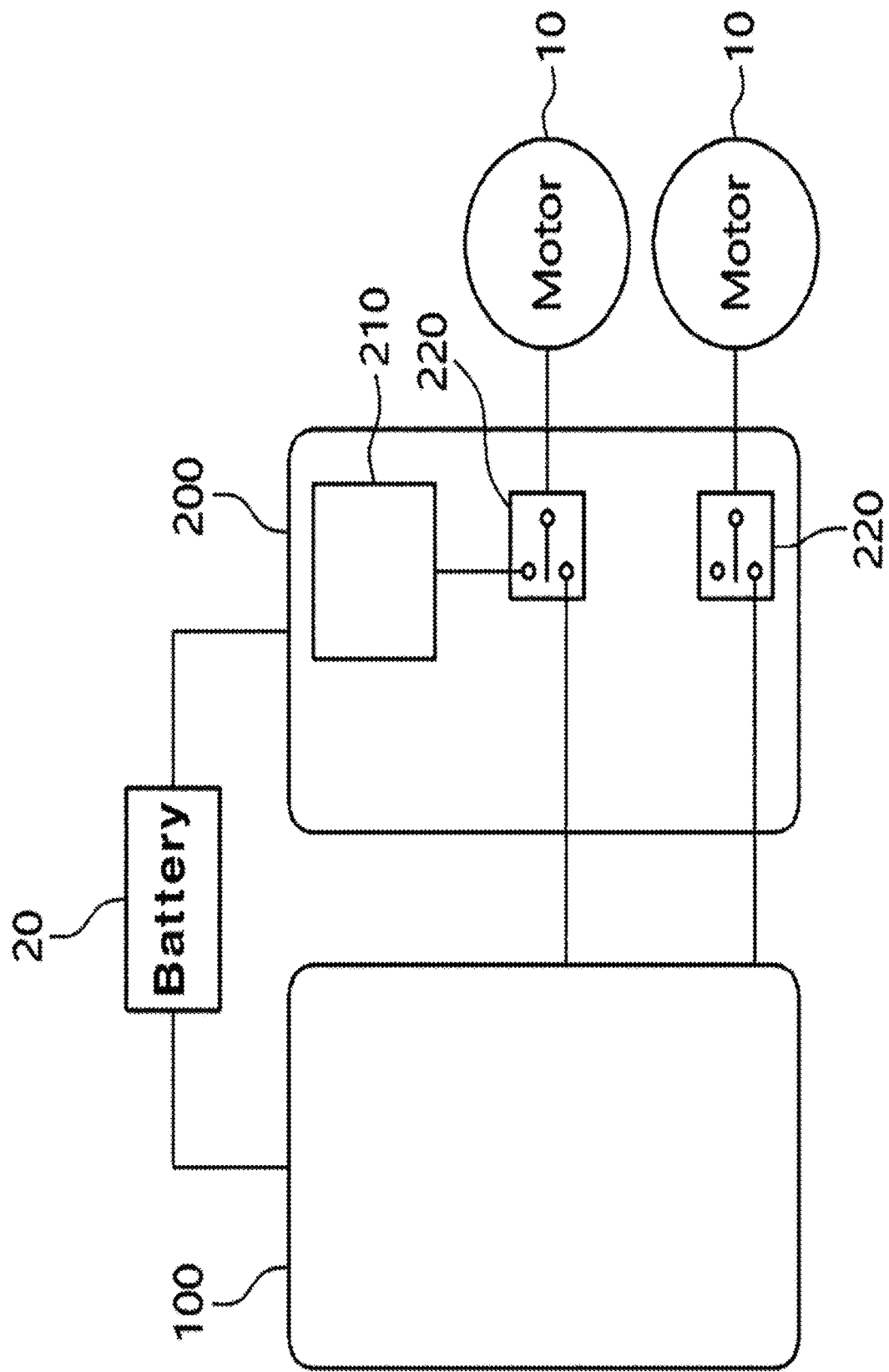
FIG. 1 is a diagram schematically illustrating the electronic parking brake system according to an exemplary embodiment of the present disclosure.

Hereinafter, preferred exemplary embodiments according to the present disclosure will be described in detail with reference to the accompanying drawings. The detailed description set forth below in conjunction with the appended drawings is intended to describe the exemplary embodiments of the present disclosure and is not intended to represent the only exemplary embodiments in which the present disclosure may be practiced. In order to clearly describe the present disclosure in the drawings, parts that are not related to the description may be omitted, and the same reference numerals may be used for the same or similar components throughout the specification.

FIG. 1 is a diagram schematically illustrating the electronic parking brake system according to an exemplary embodiment of the present disclosure.

The electronic parking brake system 1 of FIG. 1 (hereinafter, referred to as a system 1) includes a first ECU (electronic control unit) 100, a second ECU 200, a motor 10 and a battery 20.

The ECU is a configuration for performing the overall control of a system 1 based on signals received from the P-Lock switch or the electric parking brake (EPB) switch, or detection signals detected by the pedal travel sensor (PTS), the motor position sensor (MPS), the wheel steering sensor (WSS) or the like, and the motor 10 may be controlled to apply a braking force to the vehicle according to the control judgment of the ECU. In the following disclosure, controlling the motor 10 may be understood as driving actuators respectively connected to a plurality of motors 10 to apply or release a braking force.

According to an exemplary embodiment of the present disclosure, the system 1 includes a first ECU 100 as a main ECU and a second ECU 200 as a sub ECU for redundancy implementation of the system 1. In this case, the first ECU 100 and the second ECU 200 may be implemented separately from each other or may be implemented in one box, but the present diclosure is not limited thereto.

The motor 10 according to an exemplary embodiment of the present disclosure is a device that is mounted on a plurality of wheels of a vehicle to apply a braking force to the parking brake, and may be mainly mounted on both sides of a wheel at the rear of the vehicle, but is not limited thereto.

According to an exemplary embodiment of the present disclosure, the second ECU 200 includes a switch (hereinafter, referred to as a first switch 220) for switching to connect a plurality of motors 10 to the first ECU 100 or the second ECU 200 based on the operating state of the first ECU 100. In this case, the first switch 220 may be a mechanical relay switch, but is not limited thereto.

The first switch 220 is basically set to be connected to the first ECU 100, and may control the first switch 220 to be connected to the second ECU 200 as necessary as the second ECU 200 detects the operating state of the first ECU 100.

Hereinafter, in the present disclosure, the operating state of the first ECU 100 will be largely divided into an activated state and an inactive state. In particular, the inactive state is a state in which the first ECU 100 cannot normally perform the control of the system 1, and includes cases in which any one error of the internal configurations of the first ECU 100, communication errors or problems in a battery 20 that supplies power to the first ECU 100 have occurred.

According to an exemplary embodiment of the present disclosure, the second ECU 200 controls the first switch 220 to be connected to the second ECU 200 based on the inactive state of the first ECU 100, and the first switch 220 controls a plurality of motors 10 while being connected to the second ECU 200.

In this case, the first ECU 100 and the second ECU 200 are supplied with power from the battery 20, and it may be supplied from the same battery or from separate batteries.

According to an exemplary embodiment of the present disclosure, the second ECU 200 includes a power reserve system 210 that stores power supplied from the battery 20. The power reserve system 210 may store power and supply power to the motor under various circumstances in which a problem occurs in the battery 20, or power for controlling the motor 10 is not supplied from the battery 20 due to the structure of the second ECU 200.

According to an exemplary embodiment of the present disclosure, the system 1 may secure the redundancy of a brake through the second ECU 200 including the power reserve system 210.

Figure 2:
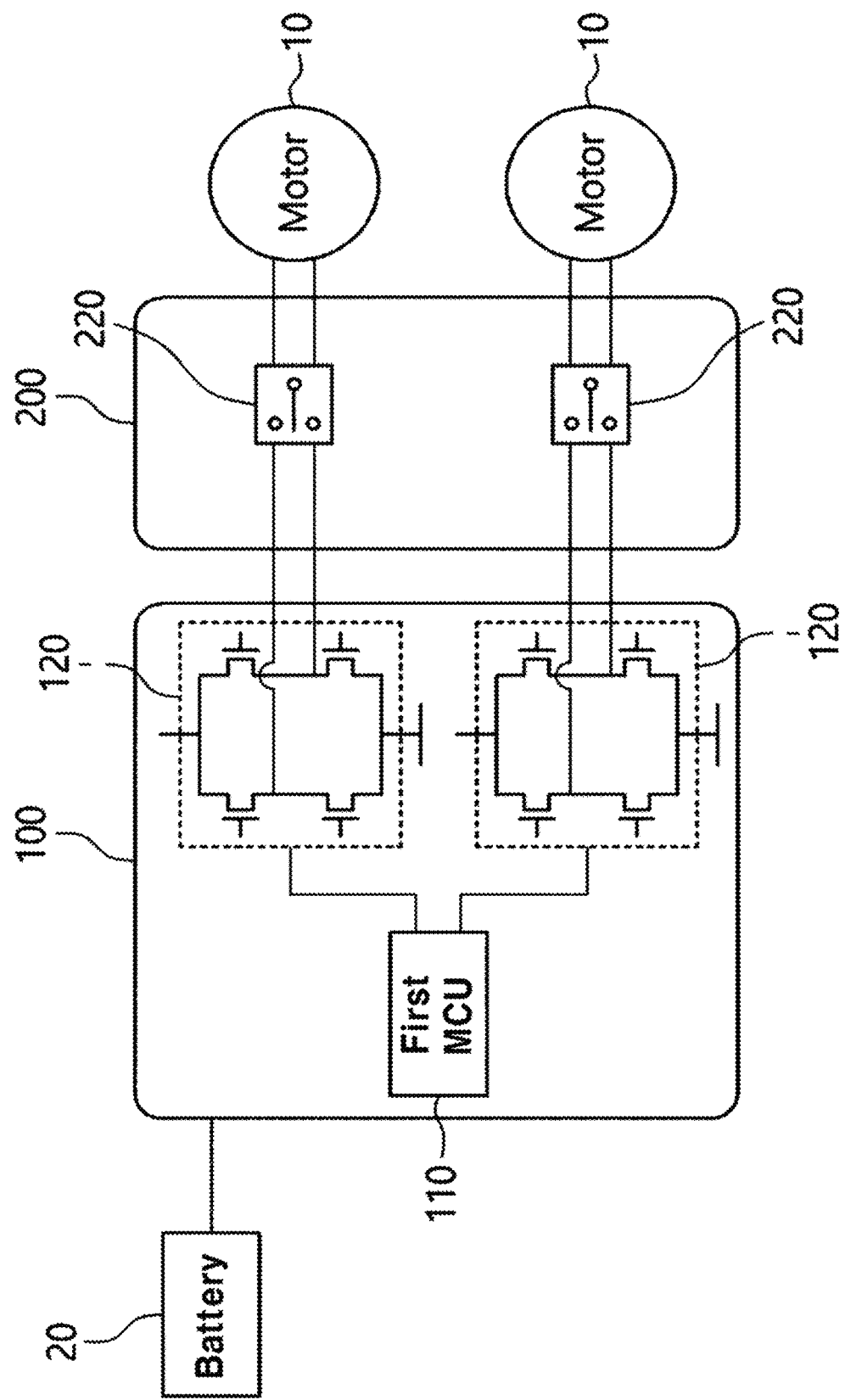
FIG. 2 is a diagram illustrating a first ECU of the electronic parking brake system according to an exemplary embodiment of the present disclosure.

Hereinafter, various exemplary embodiments of securing vehicle redundancy in relation to the power reserve system 210 in the system 1 will be described in detail. FIG. 2 is a diagram illustrating a first ECU of the electronic parking brake system according to an exemplary embodiment of the present disclosure.

FIG. 2 illustrates in detail the first ECU 100 of the system 1. The first ECU 100 according to an exemplary embodiment of the present disclosure includes a first MCU 110 and a motor driving circuit 120.

According to an exemplary embodiment of the present disclosure, the first MCU 110 receives a signal for braking a parking brake, such as a signal coming from the P-Lock switch or the electric parking brake (EPB) switch, and according to the received signal, it may control the motor driving circuit based on a detected signal which is detected by the pedal travel sensor (PTS), the motor position sensor (MPS), the wheel steering sensor (WSS) or the like. Although the operation of the first MCU 110 is not illustrated in FIG. 2, the ASIC, PMIC and the like for managing the power received from the motor driver IC and the battery 20 may be added to operate. In this case, it is assumed that the first switch 220 is connected to the first ECU 100.

According to an exemplary embodiment of the present disclosure, the motor driving circuit 120 includes a circuit for driving actuators connected to the motor 10. The motor driving circuit 120 includes a switch for switching to a first state for applying a braking force to a plurality of motors 10 or a second state for releasing a braking force applied to a plurality of motors 10. This switch may be implemented in the form of a bridge circuit as illustrated in FIG. 2.

Although not illustrated in FIG. 2, the first ECU 100 may include a motor driver IC, an ASIC, a PMIC, a watch dog (WD) counter and the like, in addition to the above.

Figure 3:
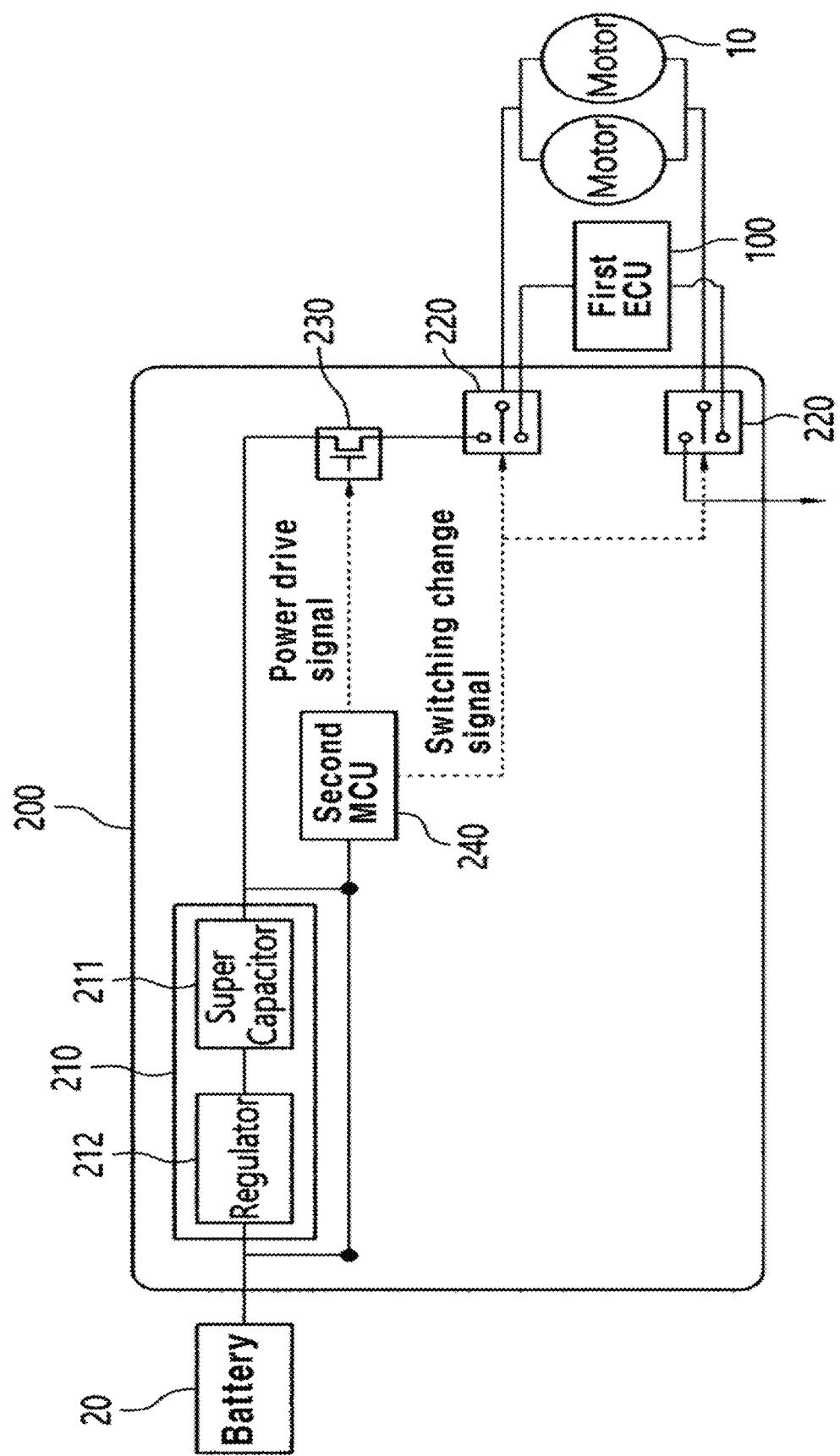
FIG. 3 is a diagram illustrating a second ECU of the electronic parking brake system according to an exemplary embodiment of the present disclosure.

FIG. 3 is a diagram illustrating a second ECU of the electronic parking brake system according to an exemplary embodiment of the present disclosure. In the present exemplary embodiment, since the configuration overlapping with the contents described in FIGS. 1 and 2 is applied in the same manner as in FIGS. 1 and 2, the detailed description thereof will be omitted.

FIG. 3 illustrates in detail the second ECU 200 of the system 1. The second ECU 200 according to an exemplary embodiment of the present disclosure includes a power reserve system 210, a first switch 220, a second switch 230 and a second MCU The power reserve system 210 according to an exemplary embodiment of the present disclosure stores power supplied from the battery 20. The system 1 of the present disclosure may secure the redundancy of the system 1 through the power reserve system 210.

More specifically, the power reserve system 210 includes a super capacitor 211 that charges a first power supplied from the battery 20 and discharges the first power based on the power supply signal. In this case, the power reserve system 210 may further include a regulator 212 for stably supplying the first power which is constant to the super capacitor 211. More details on the power reserve system 210 will be described with reference to FIGS. 7 and 8.

Herein, the power supply signal means a control signal for supplying power stored in the power reserve system 210 to control the motor 10. The power supply signal will be described in detail below in relation to the second MCU 240.

In this case, the power reserve system 210 includes the super capacitor 211 for charging and discharging power as described above, but when the super capacitor 211 is left as it is, the first switch 220 is discharged the moment it is connected to the second ECU 200 such that it may control the motor 10 even in a situation where control of the motor 10 is not required. In order to prevent this, the system 1 according to an exemplary embodiment of the present disclosure includes a second switch 230 for controlling the power supply of the power reserve system 210.

The second switch 230 according to an exemplary embodiment of the present disclosure is disposed between the super capacitor 211 and the first switch 220, and may receive a power supply signal to switch to an on state. In this case, the second switch 230 may be implemented as an FET switch operating in an on state and an off state.

Accordingly, when the second switch 230 operates in an off state to cut off the supply of power stored in the power reserve system 210 and the second MCU 240 transmits a power supply signal to the second switch 230, the power stored in the power reserve system 210 may be supplied by switching to an on state. That is, in the present exemplary embodiment, the power supply signal may be a signal for switching the second switch 230 to the on state.

According to an exemplary embodiment of the present disclosure, the second MCU 240 is a processor that performs an overall control operation of the second ECU 200. The second MCU 240 performs the same operation as the first MCU 110 of FIG. 2, but the second MCU 240 does not operate when the first ECU 100 is in the active state.

The second MCU 240 performs communication with the first ECU 100, and more specifically, with the first MCU 110 periodically or in real time through a data bus. Through this, the second MCU 240 may identify the operating state of the first ECU 100.

The second MCU 240 may receive information about the operating state of the first ECU 100 from the first ECU 100 and identify the operating state of the first ECU 100 based on the information. In this case, the information on the operating state may include an alive signal as information on whether the first ECU 100 is in an inactive state.

When the second MCU 240 identifies that the operating state of the first ECU 100 is the inactive state, it may transmit a switching change signal to the first switch 220. In this case, it can be seen that the second ECU 200 takes over the control right as the main ECU that controls the system 1.

Accordingly, the second MCU 240 receives a signal for braking the parking brake, such as a signal coming from the P-Lock switch and the EPB switch, and the motor 10 may be controlled based on a detection signal detected by the PTS, MPS, WSS and the like according to the received signal.

More specifically, when the signal for braking a brake is received, the second MCU 240 may perform an operation of identifying a wheel speed through a detection signal coming from the WSS. In order to properly brake the brake, the wheel speed must be below a certain speed, and if the wheel speed identified according to the detection signal is below a predefined speed, for example, 5 km/h or below, the second MCU 240 may control the motor 10.

In this case, the second MCU 240 may receive power from the battery 20 connected to the second ECU 200 to control the motor 10. However, when an abnormal situation occurs in the battery 20 and power cannot be supplied, the power reserve system 210 may be used.

When the power reserve system 210 is used, the second MCU 240 transmits a power driving signal to the second switch 230 to turn the second switch 230 into an on state. As the second switch 230 is turned on, the super capacitor 211 of the power reserve system 210 discharges the first power supplied from the battery 20, and the motor 10 may be controlled by the first power.

According to an exemplary embodiment of the present disclosure, it is possible to provide a more stable brake system by not only implementing redundancy for the first ECU 100, but also securing redundancy for the battery 20. In addition, by including additional control over the power supply of the power reserve system, the power reserve system may be used efficiently.

According to an exemplary embodiment of the present disclosure, since the second MCU uniformly controls the operation required for brake control without a separate configuration, the second ECU may be reduced in size and weight, and it is economically feasible.

Figure 4:
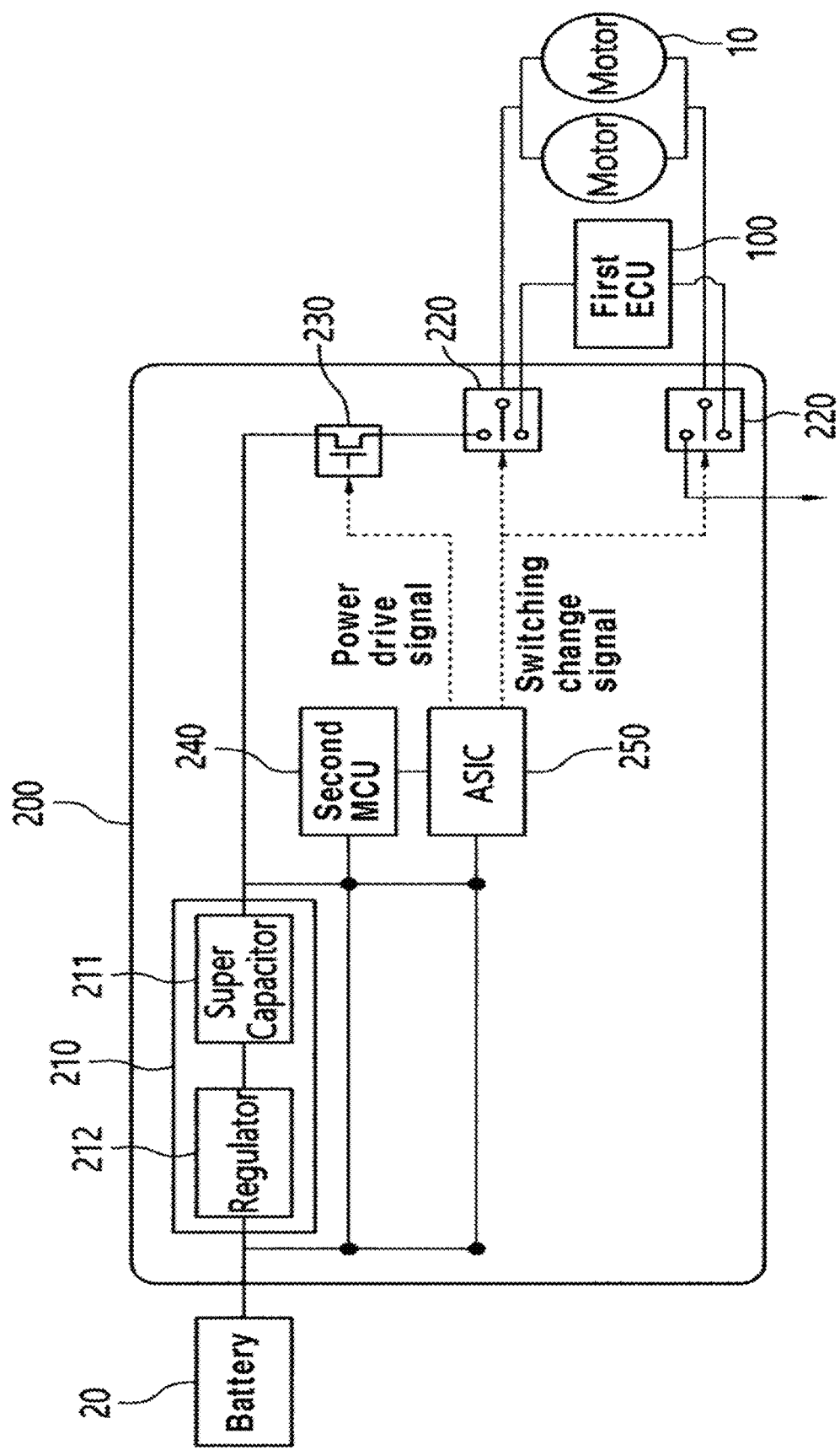
FIG. 4 is a diagram illustrating a second ECU of the electronic parking brake system according to an exemplary embodiment of the present disclosure.

FIG. 4 is a diagram illustrating a second ECU of the electronic parking brake system according to an exemplary embodiment of the present disclosure. In the present exemplary embodiment, since the configuration overlapping with the contents described above is applied in the same manner, the detailed description thereof will be omitted.

The second ECU 200 according to an exemplary embodiment of the present disclosure further includes an ASIC 250.

The ASIC 250 according to an exemplary embodiment of the present disclosure may perform the operation of the second MCU 240 described above with reference to FIG. 3.

For example, when the second MCU 240 identifies that the operating state of the first ECU 100 is inactive through communication with the first ECU 100, the ASIC 250 may transmit a switching change signal to the first switch 220.

In addition, when the second MCU 240 receives a signal for braking a brake, the ASIC 250 may perform an operation of identifying a wheel speed through a detection signal coming from the WSS. In order to properly brake the brake, the wheel speed must be below a certain speed. If the wheel speed identified according to the detection signal is below a predefined speed, for example, 5 km/h, the ASIC 250 may control the motor 10.

When the power reserve system 210 is used, the ASIC 250 may transmit a power driving signal to the second switch 230 to turn the second switch 230 into an on state. As the second switch 230 is changed to an on state, the super capacitor 211 of the power reserve system 210 discharges the first power supplied from the battery 20, and the motor 10 may be controlled by the first power.

In addition to the above, the second MCU 240 may serve as a PMIC for managing power.

According to an exemplary embodiment of the present disclosure, the ASIC shares the operation necessary for brake control, thereby reducing the control burden such as the data transmission/reception amount of the second MCU.

Figure 5:
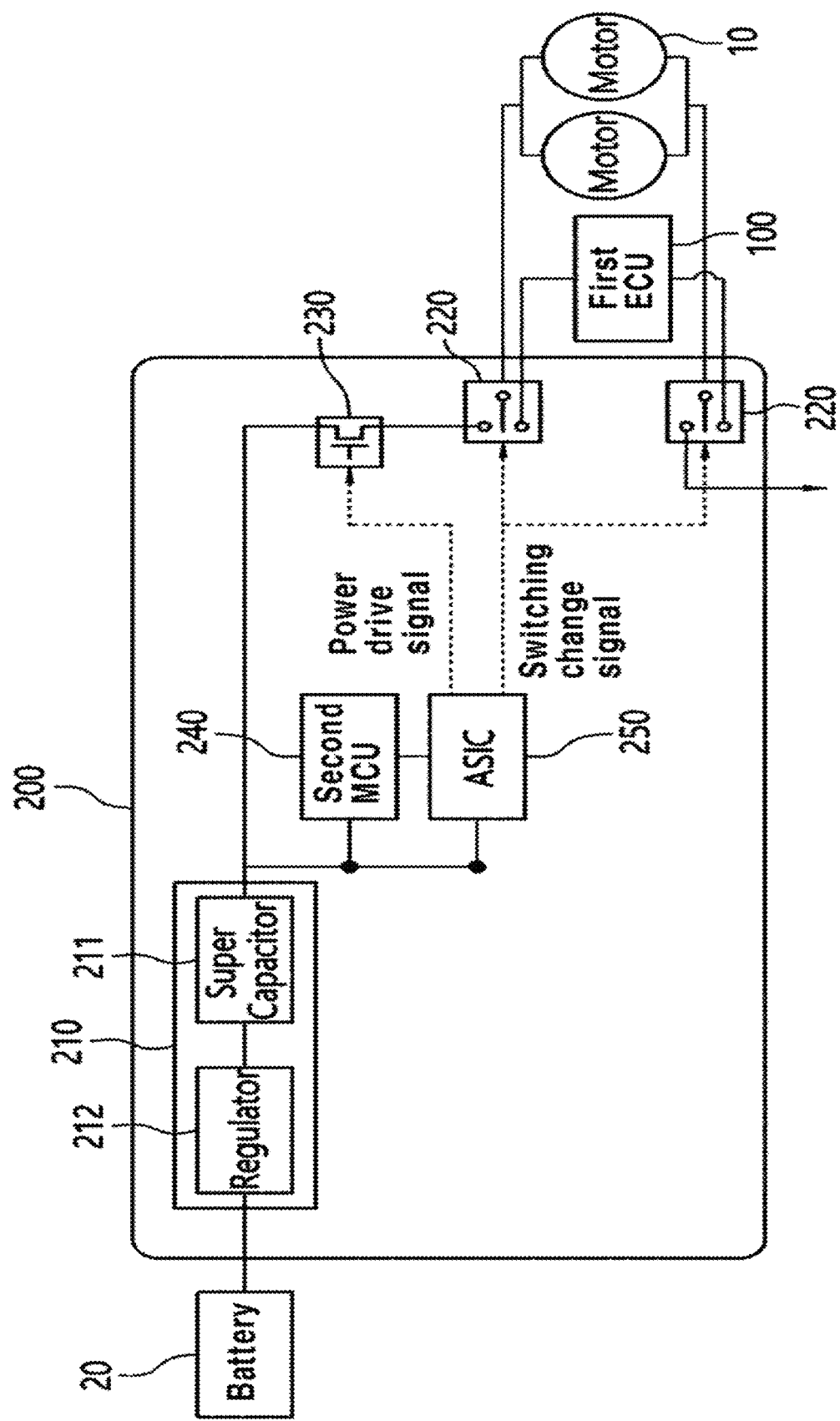
FIG. 5 is a diagram illustrating a second ECU of the electronic parking brake system according to an exemplary embodiment of the present disclosure.

FIG. 5 is a diagram illustrating a second ECU of the electronic parking brake system according to an exemplary embodiment of the present disclosure. In the present exemplary embodiment, since the configuration overlapping with the contents described above is applied in the same manner, the detailed description thereof will be omitted.

According to an exemplary embodiment of the present disclosure, it is assumed that the second MCU 240 and the ASIC 250 receive power from the power reserve system 210 without receiving power from the battery 20. In this case, when the second ECU 200 operates according to the inactive state of the first ECU 100, the second MCU 240 and the ASIC 250 may operate by receiving power from the power reserve system 210.

The super capacitor 211 of the power reserve system 210 periodically performs charging and discharging to supply power to the second MCU 240 and the ASIC 250, or may be additionally provided with a device for controlling power supply such as the second switch 230 between the power reserve system 210 and the second MCU 240.

According to an exemplary embodiment of the present disclosure, the configuration of the second ECU 200 does not need to be continuously supplied with power from the battery 20, and it is possible to reduce the manufacturing cost of the second ECU 200 provided for redundancy of the system 1 by non-installation of the power line.

Figure 6:
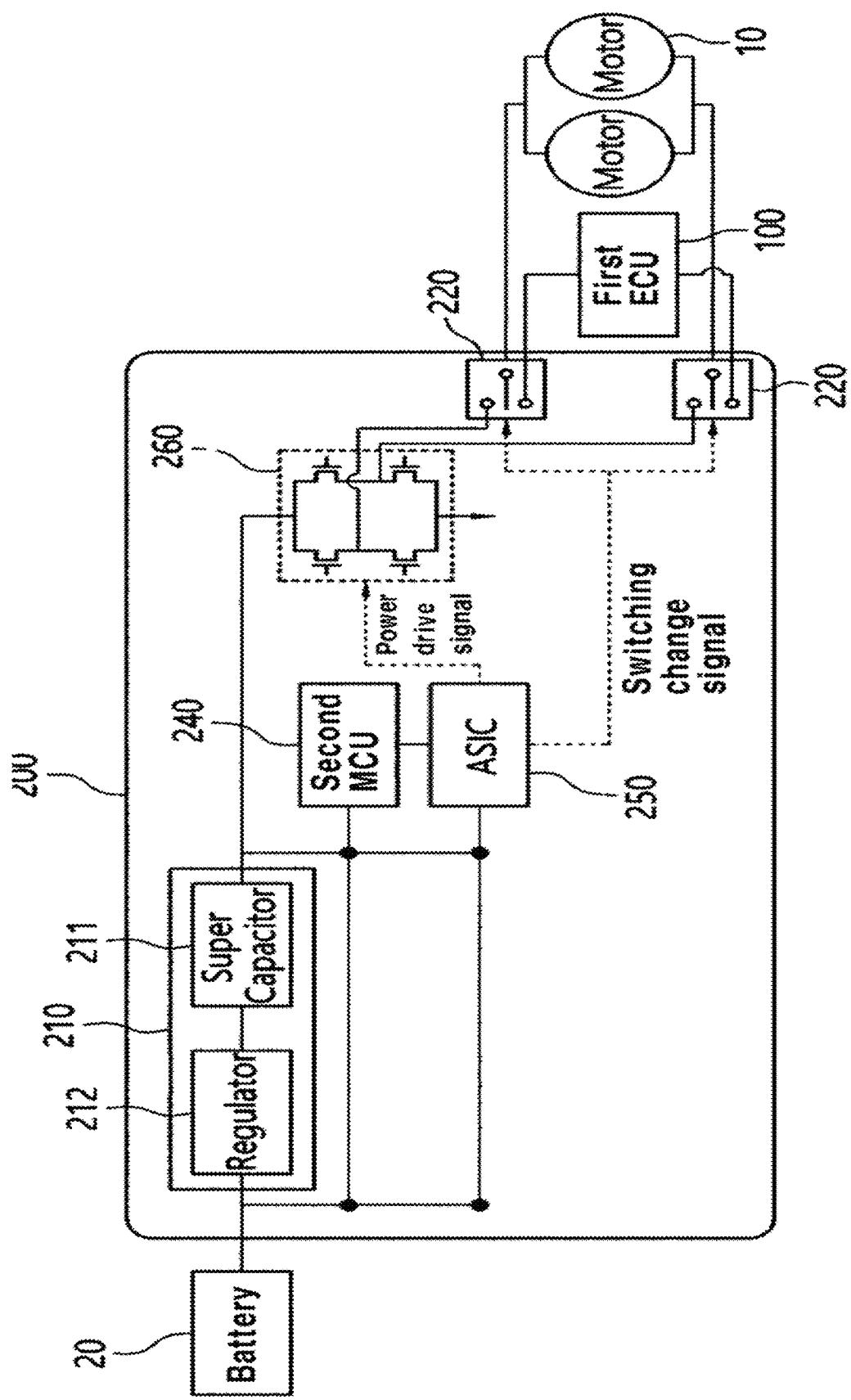
FIG. 6 is a diagram illustrating a second ECU of the electronic parking brake system according to an exemplary embodiment of the present disclosure.

FIG. 6 is a diagram illustrating a second ECU of the electronic parking brake system according to an exemplary embodiment of the present disclosure. In the present exemplary embodiment, since the configuration overlapping with the contents described above is applied in the same manner, the detailed description thereof will be omitted.

A case in which the second ECU 200 according to an exemplary embodiment of the present disclosure is implemented as a third switch 260 instead of a second switch 230 will be described.

The third switch 260 according to an exemplary embodiment of the present disclosure is disposed between the super capacitor 211 and the first switch 220, and may be a switch for changing to a first state for applying a braking force to a plurality of motors 10, or to a second state for releasing the braking force applied to a plurality of motors 10, and this switch may be implemented in the form of a bridge circuit as illustrated in FIG. 6.

The second MCU 240 or the ASIC 250 determines the status of the system 1, and the third switch 260 may transmit a first power supply signal for changing to the first state or a second power supply signal for changing to the second state to the third switch 260. In this case, it is assumed that the first switch 220 is connected to the second ECU 200.

More specifically, the second MCU 240 or the ASIC 250 identifies a wheel speed based on a detection signal received from the WSS as the signal for braking the brake is received, and if the wheel speed is less than or equal to a predefined value, the first power supply signal may be transmitted to the third switch 260. Accordingly, the third switch 260 receives the first power supply signal and switches to the first state in which the braking force is applied to the plurality of motors 10.

The second MCU 240 or the ASIC 250 may transmit a second power supply signal to the third switch 260 in response to receiving a signal for releasing a braking force applied to the brake. The third switch 260 receives the second power supply signal and switches to the second state in which the braking force applied to the plurality of motors 10 is released.

In this case, the super capacitor 211 according to an exemplary embodiment of the present disclosure may discharges the first power based on the first power supply signal and charge the first power from the battery based on the second power supply signal.

According to an exemplary embodiment of the present disclosure, since it is possible to apply and release a braking force to the brake through the second ECU, the power reserve system 210 may be repeatedly used, and the power reserve system 210 may be efficiently utilized.

Figure 7:
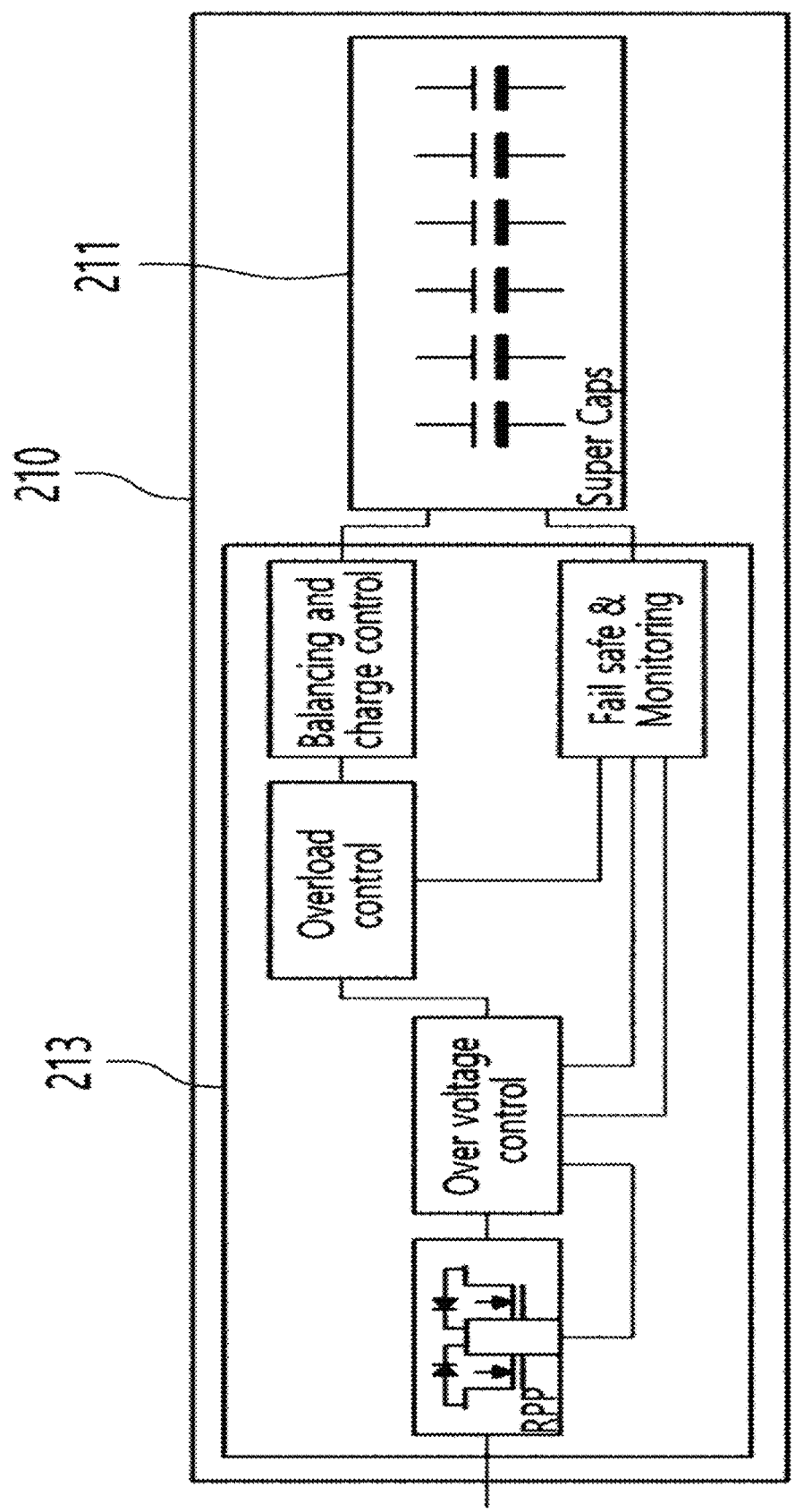
FIG. 7 is a diagram illustrating a power reserve system of the electronic parking brake system according to an exemplary embodiment of the present disclosure.

FIG. 7 is a diagram illustrating a power reserve system 210 of the electronic parking brake system according to an exemplary embodiment of the present disclosure. In the present exemplary embodiment, since the configuration overlapping with the contents described above is applied in the same manner, the detailed description thereof will be omitted.

The power reserve system 210 according to an exemplary embodiment of the present disclosure may include a power protection circuit 213 including a super capacitor 211 and a regulator 212.

In the case of the super capacitor 211, a plurality of capacitors may be configured to charge a sufficient amount of voltage consumed to apply a braking force to the brake, and the number thereof is not limited.

However, due to the characteristics of each capacitor, when it is charged beyond the chargeable voltage, abnormalities such as failure may occur. Accordingly, the power protection circuit 213 ensures that the voltage charged in the super capacitor 211 is constant, and serves as a safety device.

The power protection circuit 213 may include components such as over voltage control, over load control, balancing and charge control and the like, and these components are may further include the configuration of fail-safe & monitoring to monitor whether these components are stably operated.

According to an exemplary embodiment of the present disclosure, by not only charging a predetermined voltage to the super capacitor, but also by stably driving the power reserve system including the super capacitor, it is possible to further improve stability in redundancy implementation.

Figure 8:
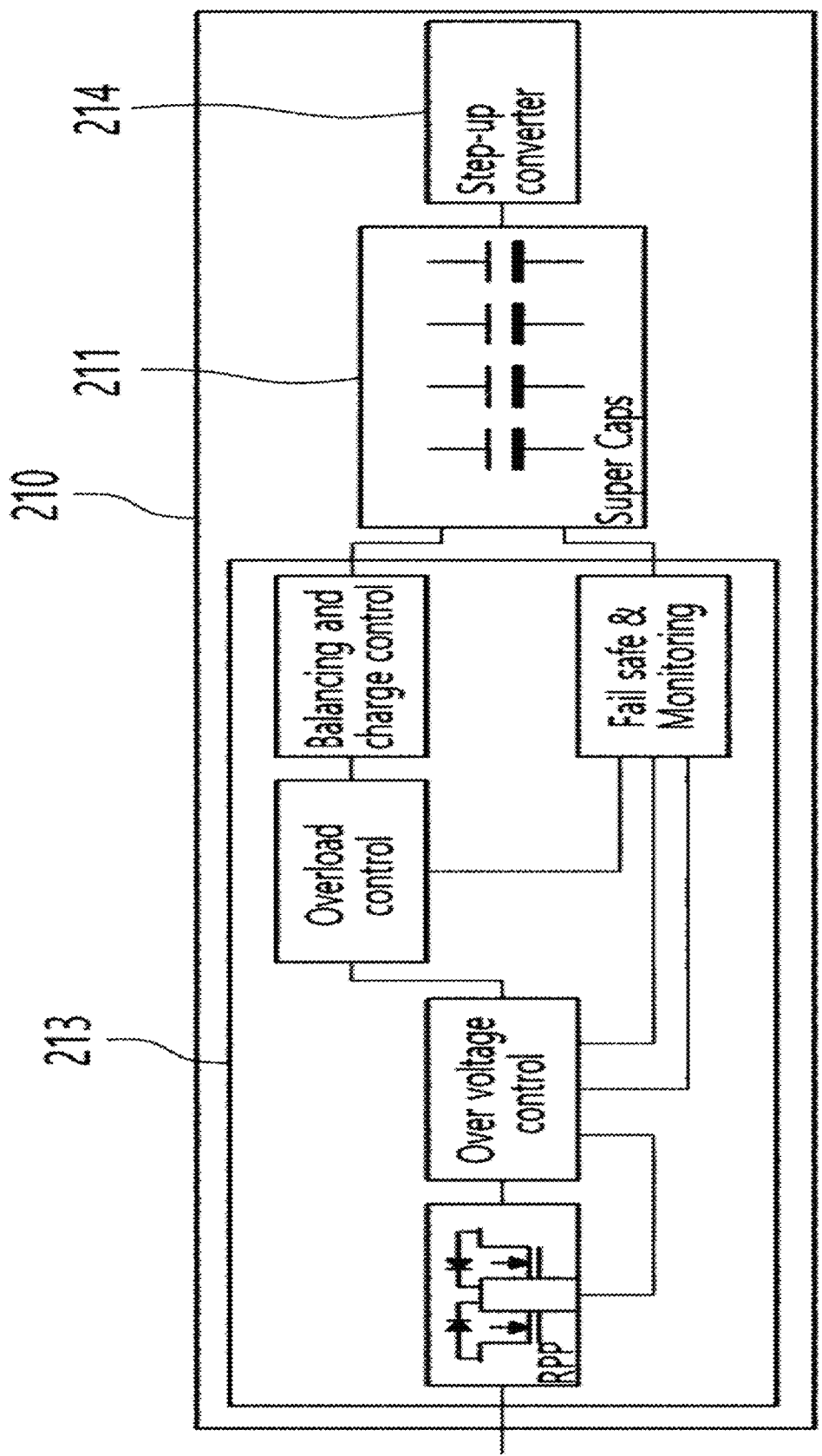
FIG. 8 is a diagram illustrating a power reserve system of the electronic parking brake system according to an exemplary embodiment of the present disclosure.

FIG. 8 is a diagram illustrating a power reserve system of the electronic parking brake system according to an exemplary embodiment of the present disclosure. In the present exemplary embodiment, since the configuration overlapping with the contents described above is applied in the same manner, the detailed description thereof will be omitted.

The power reserve system 210 according to an exemplary embodiment of the present disclosure is a more practical implementation of the power reserve system described with reference to FIG. 7.

A part of the super capacitor 211 included in the power reserve system 210 according to an exemplary embodiment of the present disclosure may be replaced with a step-up converter 214. The step-up converter 214 serves to increase the voltage to match the voltage required for the power reserve system 210 while having a lower cost than the super capacitor 211. The step-up converter 214 may increase a voltage of the first power charged in the super capacitor 211 to a second power which voltage is higher than the voltage of the first power.

Accordingly, the method of replacing some capacitors included in the super capacitor 211 with the step-up converter 214 may be attempted. In this case, as illustrated in FIG. 8, two capacitors were reduced compared to the power reserve system of FIG. 7 and the voltage corresponding thereto was replaced with the step-up converter 214, but the number of replaced capacitors is not limited thereto.

According to an exemplary embodiment of the present disclosure, it is possible to achieve a cost reduction effect of the power reserve system that allows the system 1 to be stably operated.

EXPLANATION OF REFERENCE NUMERALS

1: System
10: Motor
20: Battery
100: First ECU
110: First MCU
120: Motor drive circuit
200: Second ECU
210: Power reserve system
220: First switch
230: Second switch
240: Second MCU
250: ASIC
260: Third switch

The invention claimed is:
1. An electronic parking brake system, comprising:
a first ECU (electronic control unit) connected to a plurality of motors and a second ECU connected to the plurality of motors for providing a driving force to a wheel to control the plurality of motors,
wherein the second ECU comprises:
a power reserve system operable to store a power supplied from a battery and supply, instead of the battery, the stored power to the second ECU;
a switch connected to the first ECU, the second ECU, and the plurality of motors and operable to switch the plurality of motors to be connected with the first ECU via the switch or the plurality of motors to be connected with the second ECU via the switch, based on an operating state of the first ECU; and
a second MCU for identifying the operating state of the first ECU, controlling the switch to connect the plurality of motors from the first ECU to the second ECU based on the operating state being an inactive state, and controlling the plurality of motors through the power stored in the power reserve system.

2. The electronic parking brake system of claim 1, wherein the power reserve system comprises a super capacitor for charging a first power supplied from the battery and discharging the first power based on a power supply signal.

3. The electronic parking brake system of claim 2, wherein the switch is a first switch,
wherein the power supply signal includes a first power supply signal and a second power supply signal, wherein a third switch, which is disposed between the super capacitor and the first switch and configured to switch to a first state for applying a braking force to the plurality of motors by receiving the first power supply signal, or to a second state for releasing a braking force applied by the plurality of motors by receiving the second power supply signal, is included, and wherein the second MCU transmits the first power supply signal or the second power supply signal to the third switch to control the plurality of motors.

4. The electronic parking brake system of claim 3, wherein the super capacitor discharges the first power based on the first power supply signal, and charges the first power from the battery based on the second power supply signal.

5. The electronic parking brake system of claim 3, wherein the second ECU further comprises an ASIC, wherein the ASIC identifies a wheel speed based on a detection signal received from a WSS in response to receiving a braking signal, and transmits the first power supply signal to the third switch, if the wheel speed is less than or equal to a predefined value.

6. The electronic parking brake system of claim 2, wherein the power reserve system further comprises a regulator for supplying the first power which is constant to the super capacitor.

7. The electronic parking brake system of claim 2, wherein the switch is a first switch, wherein a second switch, which is disposed between the super capacitor and the first switch and configured to receive the power supply signal and switch to an on state, is included, and wherein the second MCU transmits the power supply signal to the second switch to control the plurality of motors.

8. The electronic parking brake system of claim 7, wherein when a braking signal is received, the second MCU identifies a wheel speed based on a detection signal received from a WSS, and transmits the power supply signal to the second switch, if the wheel speed is less than or equal to a predefined value.

9. The electronic parking brake system of claim 7, wherein the second ECU further comprises an ASIC, and wherein the ASIC identifies a wheel speed based on a detection signal received from a WSS in response to receiving a braking signal, and transmits the power supply signal to the second switch, if the wheel speed is less than or equal to a predefined value.

10. The electronic parking brake system of claim 1, wherein the second MCU identifies the operating state by receiving information about the operating state from the first ECU, and transmits a switching change signal to the switch according to the operating state.

11. The electronic parking brake system of claim 1, wherein the switch is a first switch, and wherein the first ECU comprises:

a motor driving circuit respectively connected to the plurality of motors to drive a plurality of actuators for controlling the plurality of motors; and a first MCU for controlling the plurality of motors through the motor driving circuit based on receiving a braking signal.

12. The electronic parking brake system of claim 11, wherein the second MCU performs communication with the first MCU periodically or in real time through a data bus.

13. The electronic parking brake system of claim 2, wherein the power reserve system further comprises a power protection circuit to supply the first power which is constant to the super capacitor.

14. The electronic parking brake system of claim 13, wherein the power reserve system further comprises a step-up converter for increasing a voltage of the first power charged in the super capacitor to a second power which voltage is higher than the voltage of the first power.

15. A method for controlling an electronic parking brake system comprising a first ECU (electronic control unit) connected to a plurality of motors and a second ECU connected to the plurality of motors for providing a driving force to a wheel to control the plurality of motors, the method comprising the steps of:

storing a power supplied from the battery in a power reserve system of the second ECU, wherein the power reserve system is operable to supply, instead of the battery, the stored power to the second ECU;

identifying an operating state of the first ECU;

controlling a switch, connected to the first ECU, the second ECU, and the plurality of motors, so as to switch from a first connection state in which the plurality of motors is connected with the first ECU via the switch to a second connection state in which the plurality of motors is connected with the second ECU via the switch, based on the operating state being an inactive state; and controlling the plurality of motors through the power stored in the second ECU.

16. The method of claim 15, wherein the power reserve system comprises a super capacitor for charging a first power supplied from the battery and discharging the first power based on a power supply signal.

17. The method of claim 16, wherein the switch is a first switch, wherein a second switch, which is disposed between the super capacitor and the first switch and configured to receive the power supply signal and switch to an on state, is included, and wherein the step of controlling of the plurality of motors comprises controlling the plurality of motors by transmitting the power supply signal to the second switch.

18. The method of claim 17, wherein the step of controlling the plurality of motors comprises the steps of:

identifying a wheel speed based on a detection signal received from WSS when a braking signal is received; and transmitting the power supply signal to the second switch if the wheel speed is less than or equal to a predefined value.

19. The method of claim 16, wherein the switch is a first switch, wherein the power supply signal includes a first power supply signal and a second power supply signal, wherein a third switch, which is disposed between the super capacitor and the first switch and configured to switch to a first state for applying a braking force to the plurality of motors by receiving the first power supply signal, or to a second state for releasing a braking force applied by the plurality of motors by receiving the second power supply signal, is included, and wherein the step of controlling the plurality of motors comprises controlling the plurality of motors by transmitting the first power supply signal or the second power supply signal to the third switch.

20. The method of claim 16, wherein the power reserve system further comprises a regulator for supplying the first power which is constant to the super capacitor.

\* \* \* \* \*